United States Patent [19]

Mesher

[11] Patent Number: 4,654,732
[45] Date of Patent: Mar. 31, 1987

[54] TRANSPORT APPARATUS FOR LOADING MICRODISKS INTO AND RETRIEVING THEM FROM A DISK DRIVE AND THEREAFTER SORTING THEM

[76] Inventor: Mark Mesher, 80 Nanepashmet Rd., Marblehead, Mass. 01945

[21] Appl. No.: 609,142

[22] Filed: May 11, 1984

[51] Int. Cl.[4] .......................................... G11B 17/04
[52] U.S. Cl. .................................................... 360/98
[58] Field of Search ............... 360/98, 99, 71; 414/37, 414/92, 126, 131, 751

[56] References Cited

U.S. PATENT DOCUMENTS

| | | | |
|---|---|---|---|
| 4,127,882 | 11/1978 | Kohl et al. | 360/98 |
| 4,195,321 | 3/1980 | Chelin et al. | 360/98 |
| 4,504,878 | 3/1985 | Gutmann | 360/98 |
| 4,510,542 | 4/1985 | Aggeler | 360/98 |

*Primary Examiner*—Robert S. Tupper
*Attorney, Agent, or Firm*—Cesari and McKenna

[57] ABSTRACT

A transport assembly adapted specifically to transport microdisks one after the other from a stack to a disk drive spaced from the stack includes a carriage which supports a finger mechanism for engaging the disks. The carriage is moved along a track from a home position adjacent the stack to an advanced position adjacent the disk drive by a special motorized crank assembly so that the finger mechanism picks off the lowest disk in the stack and pushes it into the disk drive. The crank assembly then retracts the carriage to a standby position in front of the disk drive until the completion of the read/write operation on the disk by the drive. When the disk is ejected from the disk drive, it is gripped by the finger mechanism and the crank assembly is controlled to move the carriage to its home position, thereby withdrawing the disk from the drive. As the carriage proceeds to its home position, the diskette is released from the finger mechanism and routed to a selected location below the track. The apparatus is designed to minimize downtime due to temporary jams or stoppages of the carriage along its track. Yet, if serious stoppages should occur, the apparatus minimizes stress on and damage to the apparatus parts.

10 Claims, 14 Drawing Figures

TRANSPORT APPARATUS FOR LOADING MICRODISKS INTO AND RETRIEVING THEM FROM A DISK DRIVE AND THEREAFTER SORTING THEM

This invention relates to apparatus for transporting diskettes in sequence to and from a disk drive. It relates more particularly to such apparatus capable of transporting the new so-called microdiskettes.

BACKGROUND OF THE INVENTION

Many quality control procedures call for the use of transport apparatus for transporting magnetic diskettes, also known as floppy disks, one after the other from a stack to appparatus which operates on the diskette such as a certifier which evaluates or certifies the disks in the diskettes. The apparatus then retrieves each such diskette from the certifier and routes it to one of two storage locations depending upon whether the diskette passed or failed evaluation or certification. One such transport apparatus is disclosed in applicant's copending application Ser. No. 460,316, filed Jan. 24, 1983 entitled DISKETTE SEQUENTIAL TRANSPORT APPARATUS.

The usual diskette comprises a plastic or cardboard envelope inside of which is positioned a flexible magnetic disk. See, for example, U.S. Pat. No. 3,668,658. Most diskettes in present day use have 5.25 inch diameter disks, those having largely replaced the earlier diskettes with 8 inch disks. The apparatus described in the above application is capable of handling such diskettes and effectively transporting them from a stack to a disk drive and retrieving them from the drive.

Recently, however, an even smaller storage medium known as a microdisk has been developed which has a disk that is only about 3 inches in diameter, yet carries the same amount of data as the 5.25 inch diskette. In our microdisk version, manufactured by Sony Corporation of Japan, the disk is contained in a rigid plastic case which is only 3.7 inches long, 3.54 inches wide and 0.125 inch thick. Its hub is exposed through apertures in the side of the case and one side of the case has a sliding window which is opened when the microdisk is seated in the disk drive to expose the disk to the drive's read/write head. The small size and weight of this new microdisk make it more difficult to feed the disk one after the other from a stack to a disk drive or other destination reliably on a high-speed basis. When being transported by prior apparatus, including the one described in my above pending application, the microdisk may become hung up on their way from the stack to their destinations. If unsupported, their paths may be affected by air currents. In some cases, due to the small size of the disks, the prior machines may feed a microdisk before the preceding disk has cleared the feed path or they may pick off more than one disk from the stack so that the machines jam, resulting in excessive downtime and high maintenance costs.

Also, the distances traveled by the microdisks in the prior transports tend to be rather long, resulting in a lower throughput for those machines. Additionally, the machines tend to be rather large and bulky so that they occupied a relatively large amount of table or floor space. Bearing in mind that a typical installation may require many such transports to certify or otherwise process the disk output for that installation, the overall floor space devoted to support and service the prior transports can become quite large.

The prior machines are disadvantaged in other respects. Some are relatively complex and costly to make and assemble. Some are excessively noisy so that, when a large number of such machines are located in a closed space, workers in the area are bothered by the din. Some prior transports have a relatively long cycle time. This is not only due to the long travel path of the microdisks as discussed above, it is also due to the mechanical and timing tolerances built into those machines to minimize malfunctions and jamming.

SUMMARY OF THE INVENTION

Accordingly, it is an object of the present invention to provide improved apparatus for transporting disk-type storage media from a stack to a disk drive or other destination.

Another object of the invention is to provide such a transport which is specifically able to handle so-called mini-diskettes which are characterized by their small size and low weight.

A further object of the invention is to provide apparatus for sequentially transporting microdisks from a stack to a disk drive and for retrieving each disk, in turn, from the drive for routing to a selected destination or destinations.

Still another object of the invention is to provide such apparatus which reliably positions each microdisk properly in the disk drive.

Another object of the invention is to provide apparatus of this type which is relatively easy and inexpensive to make and maintain.

Yet another object of the invention is to provide such apparatus which properly positions a disk drive to receive the microdisks delivered to it from the stack.

A further object of the invention is to provide such transport apparatus which permits ready and easy access to its internal parts as well as to the disk drive which it serves.

Still a further object of the invention is to provide transport apparatus of this type which is not prone to jamming.

Yet another object of the invention is to provide microdisk transport apparatus which is easy to operate.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, my invention is embodied in transport apparatus for feeding microdisks one after the other from a stack of such disks to a disk drive capable of writing on and/or reading from each disk, usually but not necessarily for purposes of evaluating or certifying the disk. After each disk is processed in and ejected from the disk drive, it is conveyed by the apparatus to one of two locations depending upon whether it passed or failed the evaluation or certification test. The main components of the present apparatus are mounted on a base which supports a magazine or hopper capable of containing a tall stack of the new, small size microdisks. Spaced along the base and adjustably secured thereto is a mount for a disk drive capable of reading on and writing from such a disks. The apparatus also includes a carriage which is movable along a fixed track extending underneath the hopper from an advanced position adjacent the drive mount to a retracted or home position spaced on the opposite side of the hopper from that mount.

The motion of the carriage is controlled by a unique motorized crank assembly supported by the base and which has sufficient throw to shift the carriage between its home and advanced positions as the crank rotates between its bottom dead center and top dead center positions. The crank is driven by a step motor actuated by a controller referenced to the output from an angular position encoder which detects when the crank is at bottom dead center, placing the carriage in its home position. When the crank assembly moves the carriage from its home position toward the advanced position, a special finger mechanism supported on the carriage and to be described in detail later engages only the lowest microdisk in the stack and pushes that disk toward the disk drive mounted in the drive mount. As soon as that disk clears the hopper, it drops a short distance to a lower level below the hopper which is aligned with the loading slot of the disk drive. As the carriage proceeds to its advanced position, the finger mechanism pushes the microdisk along that lower level into the disk drive loading slot until the disk seats properly in the drive. That seating is sensed by the drive which thereupon commences a read/write operation on the disk. In the meantime, the step motor continues turning the cank to a selected angle past top dead center as determined by the encoder output and then stops, causing the carriage to back off from the disk drive to, and remain at, a standby position just in front of the disk drive.

Upon the completion of the read/write operation by the disk drive on the disk therein, the drive applies a signal to the transport's controller which actuates a solenoid adjacent the disk drive mount to press the drive's EJECT button. Thereupon, the disk drive ejects the microdisk far enough to engage the finger mechanism on the carriage waiting at its standby position in front of the drive. The controller also actuates the finger mechanism causing it to grip that disk and issues control signals to the step motor which thereupon rotates the crank toward bottom dead center to return the carriage to its home position. With the disk gripped by the retracting finger mechanism thusly, sufficient clearance exists between the disk and the bottom of the stack remaining in the hopper to permit that disk to be pulled along under the stack toward the retracted position of the carriage.

Before the carriage reaches that position, however, the microdisk is released and stripped from the finger mechanism so that it drops into a receiving location such as a bin supported by the base below the hopper. In a preferred embodiment of the present apparatus, when the disk drive is being used for certification or evaluation, there are at least two such bins and each retracting disk is routed to one or the other of those bins depending upon whether it passed or failed evaluation or certification in the disk drive. The routing of the disk to the bins is controlled by the position of a selection assembly mounted to the base below the hopper which will be described later in detail. In the meantime, the crank assembly moves the carriage to its home position in preparation for the next cycle of the apparatus which will transport the next microdisk now present at the bottom of the stack from the hopper to the disk drive, which cycle can be initiated manually or automatically as desired.

The motorized crank assembly which moves the carriage between its operative positions has several advantages over belt drives and other mechanisms used for this purpose in prior transports of this general type. That assembly is quite compact; it maintains precise control over the movements of the carriage between its various operative positions; it can operate reliably for a prolonged period at high speed, thereby minimizing the cycle time of the apparatus as a whole and maximizing its throughput. Also, that assembly, when operating, is quite quiet so that the apparatus as a whole creates a minimum amount of noise that could be bothersome to personnel in its vicinity.

Another major advantage of the present transport over prior comparable machines of this general type is its ability to minimize jams and, if such jams should occur, to minimize the damage caused thereby to the microdisks or to the transport itself. And, as will be detailed later, the apparatus includes electrical interlocks which stop the transport when a disk has failed to leave or to arrive at critical locations in its course between the disk hopper and the disk drive due to the disk's becoming jammed in the apparatus or being overtaken by a succeeding disk. If, however, for some reason, a jam should occur and the carriage is unable to move along its track, the motorized crank assembly is designed to stall thereby avoiding serious damage to the microdisks, to the crank assembly or to other parts of the apparatus.

The present transport is further advantaged in that all of its internal components and the disk drive supported by its drive mount can be exposed to facilitate maintenance and repair of the apparatus and the drive. The transport is easy to operate, particularly in its automatic mode and it can run reliably for a prolonged period without maintenance or repair. Therefore, it should find wide application wherever it is necessary to feed a large number of microdisks one after the other from a stack to a selected location reliably at high speed.

BRIEF DESCRIPTION OF THE DRAWINGS

For a fuller understanding of the nature and objects of the invention, reference should be had to the following detailed description, taken in connection with the accompanying drawings, in which.

DETAILED DESCRIPTION OF THE PREFERRED EMBODIMENT

Figure 1:
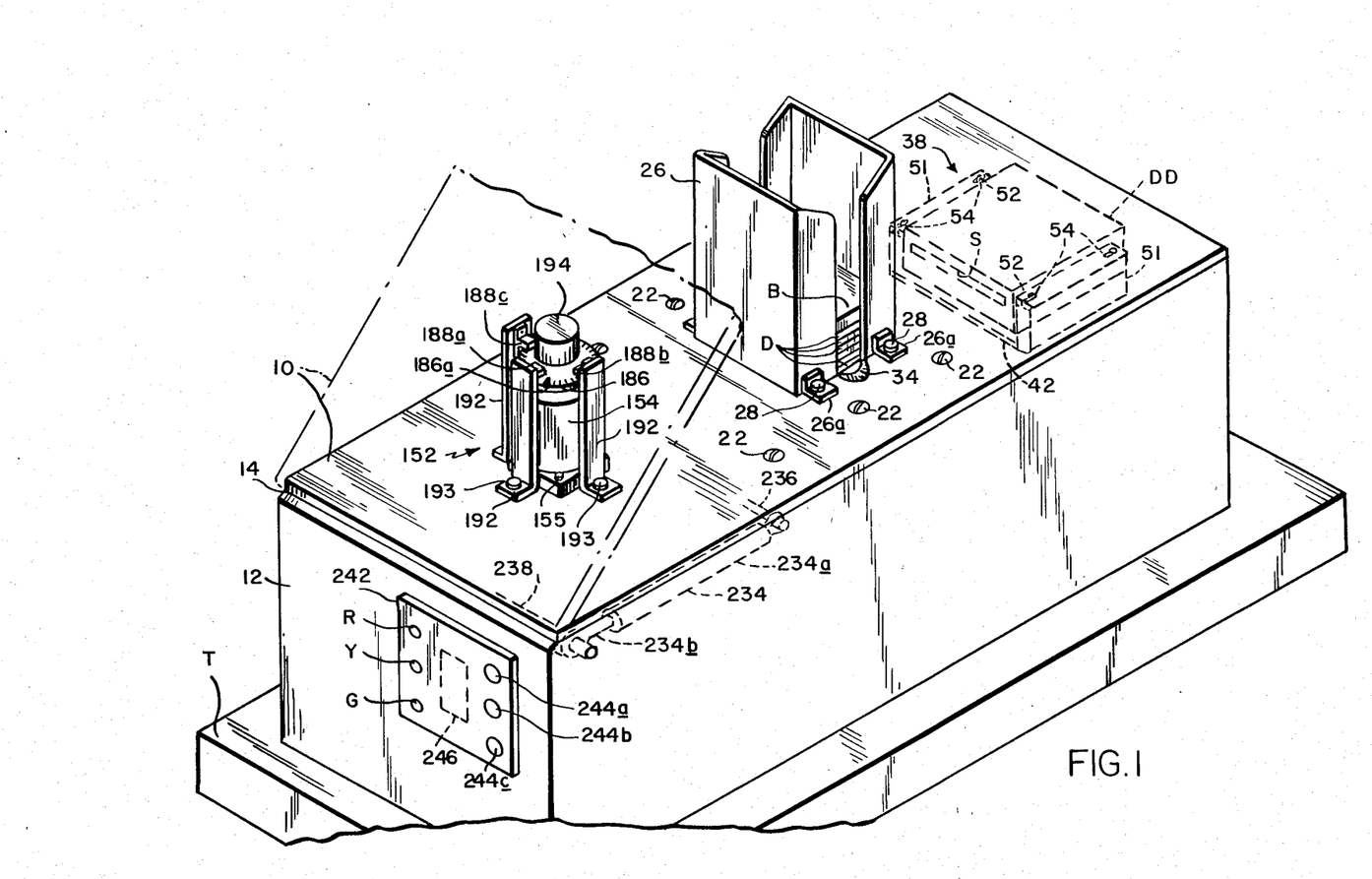
FIG. 1 is an isometric view of a microdisk transport embodying the features of my invention.
Figure 2:
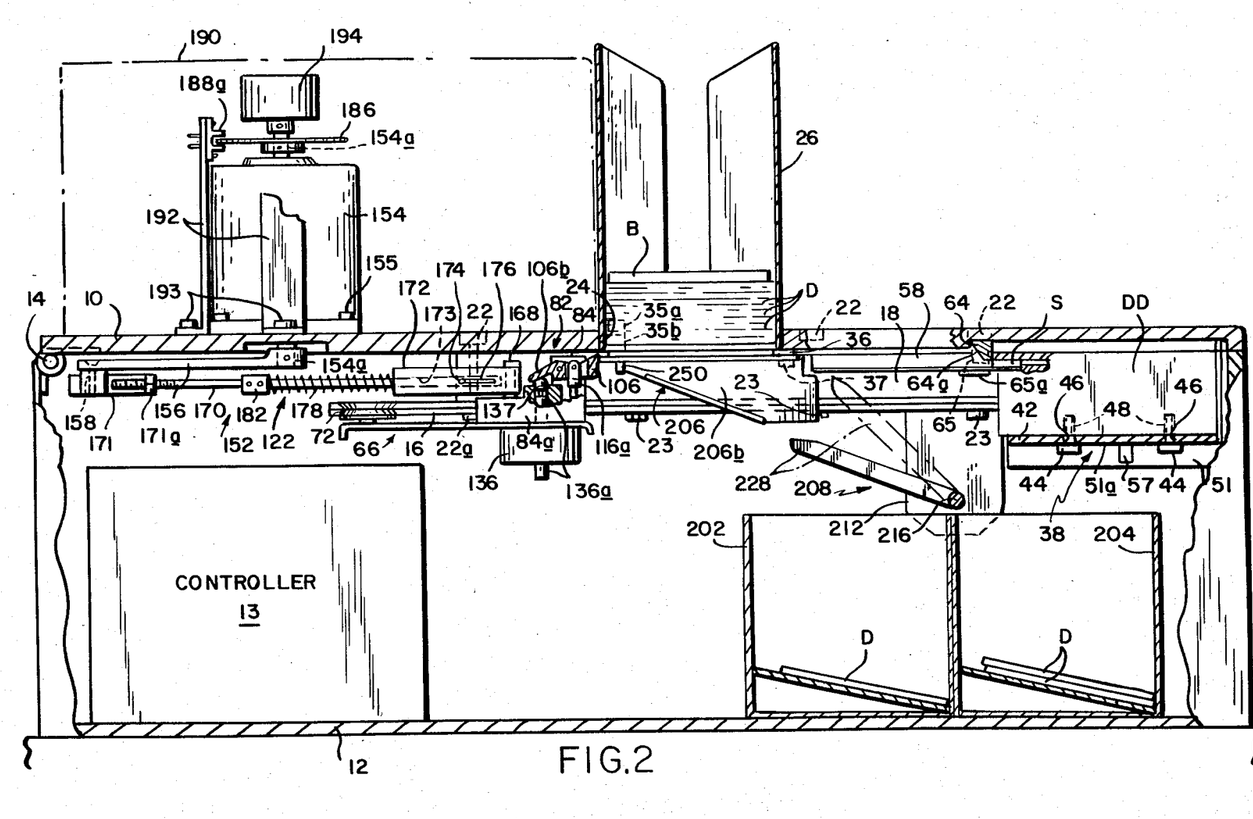
FIG. 2 is a side elevational view with parts broken away thereof.
Figure 3:
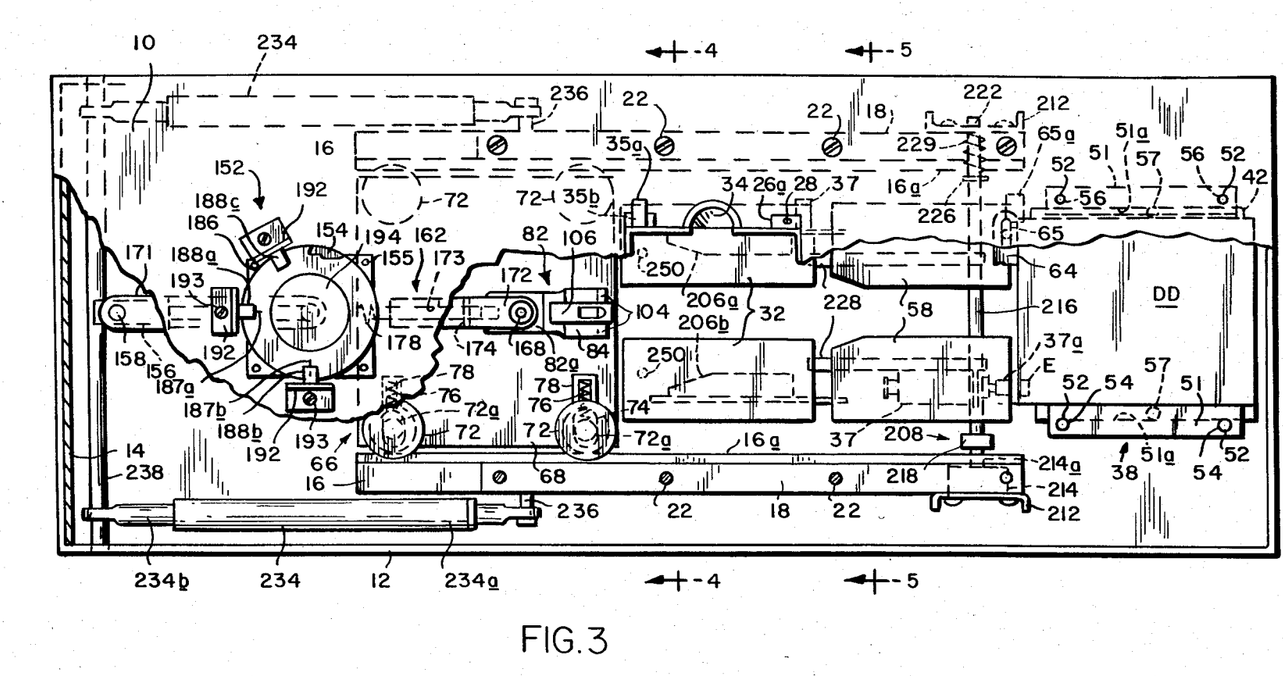
FIG. 3 is a top plan view with parts broken away thereof.

Referring now to FIGS. 1 to 3 of the drawings, the major components of my transport are mounted to a relatively thick and rigid, generally rectangular base plate 10 which constitutes the top wall of a rectangular box-like housing 12 which may rest on a table T or other horizontal surface. Housing 12 contains the transport's main controller 13 and other components of the apparatus to be described. One end of that plate, herein the left-and end, is connected to the adjacent end of housing 12 by a hinge 14 so that the base plate can be swung up as shown in dotted lines in FIG. 1, to expose the underside of the plate and the interior of the housing. Mounted to the underside of plate 10 at laterally spaced-apart locations thereon is a pair of parallel rails 16 which extend an appreciable distance along the length of the base plate. The rails have inwardly facing knife edges 16a and are spaced from the underside of plate 10 by spacer blocks 18. The rails and blocks are anchored to the plate by a series of spaced-apart bolts 22 which extend down through registering holes in the base plate, blocks and rails, appropriate nuts 22a being tightened onto the bolts at the undersides of the rails.

A large generally rectangular opening 24 is formed midway along base plate 10 between rails 16. A hopper 26 having the same cross section as the opening 24 extends up from plate 10 at the opening, being secured to the base by threaded fasteners 28 extending through hopper side flanges 26a. Opening 24 and the hopper are dimensioned to receive rather loosely a stack of standard microdisks available from Sony Corporation among others. A pair of laterally spaced-apart support plates 32 are mounted to the underside of base plate 10 so that they underlie the side edge margins of the opening 24 therein. The two plates are spaced parallel to one another and are secured to plate 10 by a series of spaced-apart threaded fasteners 34 which extend up through holes in the support plates and are screwed into threaded holes in the base plate. Thus, when a stack of disks D is placed in hopper 26, the lowest disk in the stack rests on the support plates 32. As best seen in FIGS. 1 and 2, the side walls of hopper 26 are slotted and finger recesses 34 are formed in plate 10 at the bottoms of those slots to facilitate inserting disks into and removing them from the hopper and preferably, the stack is weighted by a reflective glass or plastic block B.

In the illustrated transport, a pair of optical detectors 35a and 35b are positioned one over the other at the left side of hopper 26. These detectors, each of which includes a light source and a photo diode, sight through appropriate holes in the hopper side wall to the interior of the hopper. When detector 35a sees the reflective block B near the bottom of the hopper indicating that the stack of disks in hopper 26 is nearly depleted, it emits a signal to controller 13. Detector 35b emits a similar signal to the controller when the block is at the bottom of the hopper and there are no more microdisks to transport.

Figure 5:
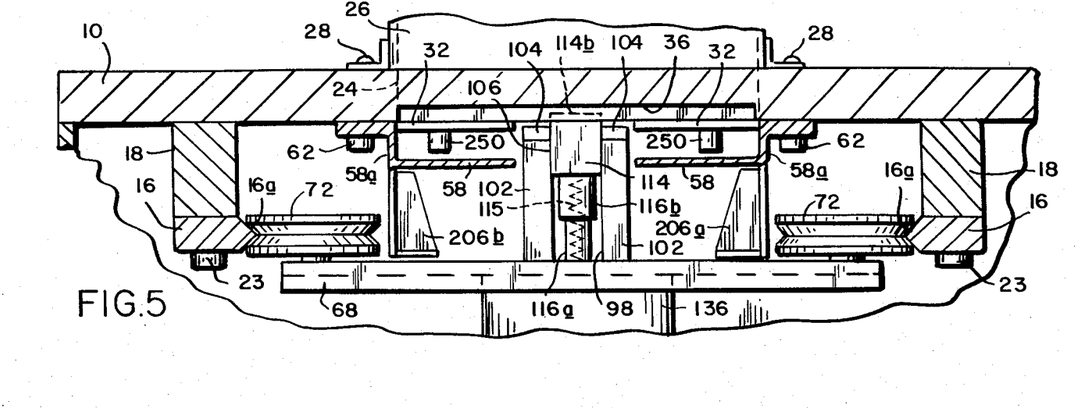
FIG. 5 is a similar view taken along line 5—5 of FIG. 3.

Also, as shown in FIGS. 2 and 5, a groove or recess is formed in the underside of base plate 10 forwardly of the opening 24 therein to provide a diskette clearance slot 36 at the front of the hopper 26 that permits the lowest disk D in the stack held by the hopper to be slid forwardly out of the hopper, i.e. toward the right as viewed in FIGS. 1 and 2. The plates 32 extend forwardly of the hopper 26 to some extent to support the trailing edge of the disk as the disk leaves the hopper. An optical detector 37 (FIG. 3) is located adjacent the left front corner of hopper 36 in position to detect the presence of a disk or portion thereof in slot 36 and upon such detection to issue a signal to controller 13.

The transport also includes a disk drive mount shown generally at 38 spaced forwardly of or to the right of hopper 26 and which is arranged to hold a disk drive DD for such microdisks close against the underside of plate 10. The mount 38 specifically illustrated comprises a plate 42 which is secured to the bottom of the drive by fasteners 44 extending through holes 46 in the plate and turned down into threaded openings 48 which are standard on the disk drives DD. The side edges of the plate, which extend beyond the sides of the drive, are slidably received in a pair of laterally spaced-apart slotted blocks 51 secured to the underside of base plate 10 by threaded fasteners 52 extending through vertical holes 54 in the blocks and screwed into threaded holes 56 in the base plate 10 as shown in FIG. 2. The position of the plate 42 along the slots in blocks 51 can be adjustably set by spring-loaded pull buttons 57 (FIG. 3) in blocks 51 which engage in holes (not shown) in plate 42.

The disk drive DD used with the present transport has a loading slot or aperture S at the front of the drive which faces hopper 26. A disk D slid into that slot is received in an internal slide (not shown) which retracts into the drive and latches to position the disk opposite the read/write head in the drive. An eject button E (FIG. 3) is present at the front of the drive which, when pushed, releases that internal slide so that the slide springs to an extended position which ejects the disk D partially from the drive through slot S. A known drive of this type is manufactured by Sony Corporation of Japan. In the present apparatus, button E is pushed automatically by the armature 37a of a solenoid actuator 37 shown in FIG. 3 and which is re-energized at the proper time by a signal from controller 13.

Referring now to FIGS. 2, 3 and 5, positioned at the underside of base plate 10 between hopper 26 and drive mount 38 is a pair of support shelves 58. These shelves are spaced apart the same distance as plates 32. However, they are spaced below base plate 10 so that they repose or reside at a lower level than plates 32 and, in fact, at a level which is even with the loading slot S in the disk drive DD supported by drive mount 38. Each shelf 58 has an upstanding outboard side wall 58a whose upper edge is turned or flanged outward and secured to the underside of base plate 10 by appropriate threaded fasteners 62 (FIG. 5).

The shelves 58 lie under the disk clearance slot 36 and extend from points adjacent the forward edges of support plates 32 to drive mount 38. When the trailing edge of the lowest disk being pushed from hopper 26 through slot 36 clears the right-hand ends of support plates 32, that disk drops onto shelves 58 and can then be slid along those shelves directly into the loading slot S of the disk drive DD in the drive mount 38. As noted previously, the plate 42 secured to the drive is slidably mounted so that the position of the disk drive can be adjusted toward and away from shelves 58, whereby the disk can be inserted freely and cleanly through the slot S into the drive.

To ensure that each disk D being advanced along shelves 58 actually enters slot S, a transverse deflection bar 64 is mounted over the right-hand ends of the shelves 58 in front of the drive mount 38. That bar has a beveled surface 64a which faces the advancing disk and deflects its leading edge downward into the disk drive slot S. That deflection bar 64 also helps to locate the front face of the drive DD as best seen in FIGS. 2 and 3. An optional detector 65 is positioned under bar 64 to sight across the mouth of slot S. If a disk is not loaded fully into the drive for any reason, the detector issues a signal to controller 13 indicating that fact.

Figure 4:
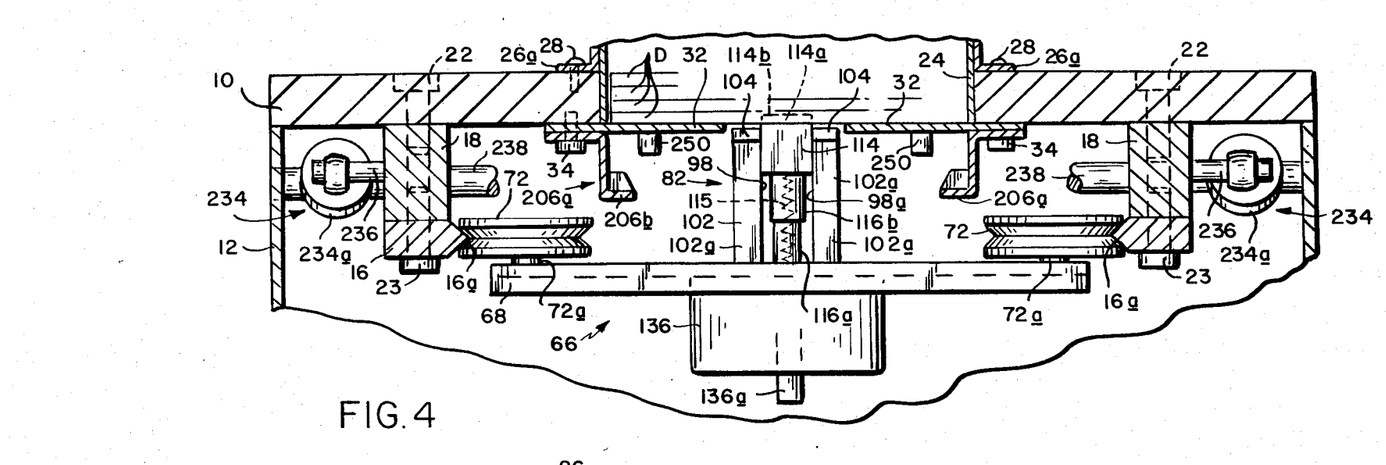
FIG. 4 is a sectional view on a larger scale taken along line 4—4 of FIG. 3.

Referring now to FIGS. 2 to 4, the disks D are moved from hopper 26 to the disk drive DD by a carriage indicated generally at 66. The carriage comprises a generally rectangular plate 68 which is dimensioned to fit between rails 16. A pair of grooved wheels 72 are rotatively mounted adjacent the four corners of plate 68 so that the wheels at opposite sides of the plate engage the adjacent rail edges 16a. This permits the carriage to roll along the rails between a fully retracted or home position at the left-hand end of the apparatus illustrated in FIGS. 2, 3 and 8A and an advanced position best seen in FIG. 8D wherein the carriage is positioned adjacent the disk drive DD. To ensure that carriage 66 travels parallel to the rails, the wheel axles at one side of the carriage are movably mounted to plate 68 and biased outwardly toward the rails. This is illustrated in FIG. 3 wherein the wheel axles 72a are shown mounted in lateral slots 74 present in plate 68 and biased laterally outward by compression springs acting between upstanding collars 78 on the plate and the wheel axles. Alternatively, each movable wheel axle 72a can be mounted at one end of a short arm whose opposite end is pivotally mounted to plate 68 with the arm being spring biased to urge the attached wheel toward the adjacent rail.

Carriage plate 68 supports a finger mechanism indicated generally at 82 which is mounted to the top of plate 68 at the longitudinal center line of that plate which coincides with the longitudinal center line of the apparatus as a whole. When carriage 66 moves from home to its advanced position shown in FIG. 8D, the finger mechanism engages and pushes the lowest microdisk D in hopper 26 from the hopper into the disk drive so that a read and/or write operation can be performed there on that disk. Then, following completion of that operation on the disk, when the carriage 66 is moved back toward its home position shown in FIGS. 2 and 3, the finger mechanism 82 pulls the disk D from the disk drive back underneath the stack of disks in hopper 26 for routing to a disk receiving location in housing 12 below rails 16.

Figure 6:
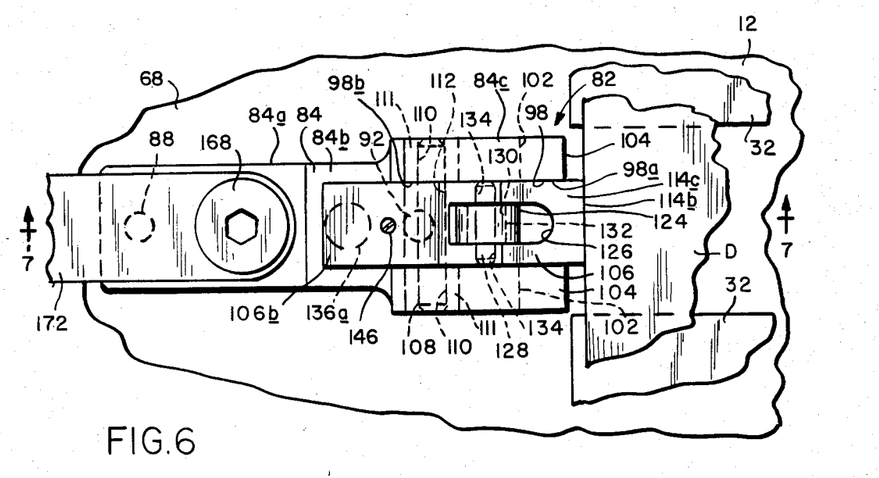
FIG. 6 is a fragmentary top plan view on a still larger scale thereof.
Figure 7:
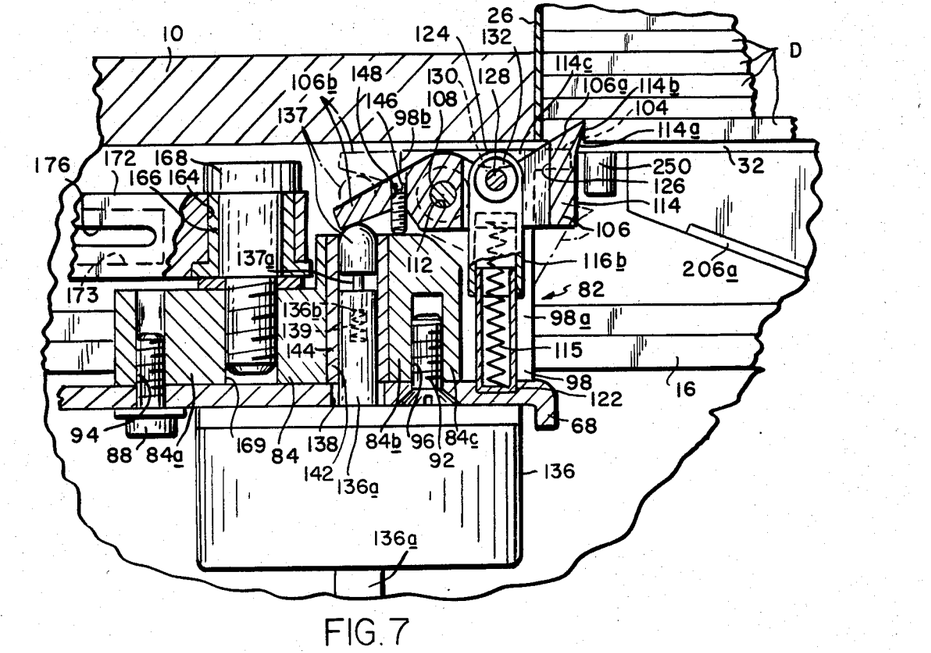
FIG. 7 is a sectional view with parts in elevation on a still larger scale showing part of the FIG. 1 transport in greater detail.

Referring now to FIGS. 6 and 7, the finger mechanism 82 comprises a block 84 supported on plate 68. The block has an elongated rear section 84a, a taller intermediate section 84b and a still taller forward section 84c whose front or leading end is set back slightly from the leading edge of plate 68. The block is secured to plate 68 by a pair of threaded fasteners 88 and 92 extending up through appropriate holes in plate 68 and screwed into internally threaded passages 94 and 96 respectively in block 84, the latter fastener having a flat head which is countersunk into plate 68.

The block forward section 84c is bifurcated in that a relatively wide channel 98 is machined in that section, with the channel having the general shape of an inverted backwards letter L. That is, the channel has a vertical leg 98a extending the entire height of block section 84c and which extends back about halfway through that block section and a shorter horizontal leg 98b at the upper end of that block section which extends all the way back through section 84c. Thus, the leading or forward end of block 84 defines a pair of laterally spaced-apart, vertically elongated abutments 102 adjacent the forward edge of plate 68. The front faces 102a of abutments 102 are, for the most part, essentially vertical, coplanar and flat. However, at the very tops of abutments 102, there are present a pair of generally rectangular stationary fingers 104 which project forwardly from the abutments so as to overhang the front or leading edge of carriage plate 68. As best seen in FIG. 4, these fingers 104 do not project above the support plates 32 that extend under the hopper so that they are always spaced somewhat below the stack of disks in the hopper.

Positioned in the block channel 98 at the top thereof between abutments 102 is a moving finger 106 which is pivotally connected to block section 84c by a laterally extending pivot pin 108 received in collinear lateral passages 110 in block section 84c lined with bearing sleeves 111 and in a registering lateral passage 112 in finger 106. A set screw 113 extending through a threaded hole in the finger engages the pin so that the pin rotates with the finger. Finger 106 has a relatively tall wedge-shaped front section 106a which projects forwardly more or less to the same extent as the stationary fingers 104. Finger 106 can pivot between an upper position shown in solid lines in FIG. 7 and a lower position illustrated in dotted lines in that same figure. When the finger is in its upper position, most of the front face 114 of finger section 106a is oriented more or less vertically and is flush with the leading edges or faces of fingers 104. Moreover, it extends vertically a distance equal to the vertical spacing between support plates 32 and shelves 58. In addition, a segment 114a at the upper end of face 114 extends above support plates 32 and angles forwardly forming with the downwardly-rearwardly inclined surface 114c of finger section 106a a sharp leading edge 114b for reasons that will become apparent later.

Finger 106 is normally biased toward its upper solid line position shown in FIG. 7 by a spring 115 which is compressed between finger section 106a and carriage plate 68. The spring is captured within a pair of generally cylindrical telescoping housing sections 116a and 116b. The lower end of housing section 116a is retained in a recess 122 in the upper surface of plate 68. The upper housing section 116b has an ear 124 projecting from its upper end. That ear extends up through a vertical slot 126 present in the moving finger 106 and is pivotally captured there by a pin 128 received in a lateral ear passage 130 which is lined with a bearing sleeve 132 and in collinear lateral passages 134 in finger section 106a.

Finger 106 is moved from its normal upper position to its lower position shown in dotted lines in FIG. 7 by a pancake solenoid 136 mounted to the underside of the carriage plate 68 and controlled by signals from controller 13 (FIG. 2). One end of the solenoid armature 136a projects up through an opening 138 in the plate and through a vertical passage 142 in block section 84b which is lined with a bearing sleeve 144. When the solenoid is de-energized, its armature is retracted and, in that position, the armature upper end projects slightly above the block section 84b where it underlies a rearwardly protruding extension 106b of the moving finger 106. Accordingly, finger 106 is normally maintained in its upper position by spring 115. However, when the solenoid is energized, its armature is shifted upwardly to its dotted line position shown in FIG. 7 so that it pivots extension 106b and the finger as a whole clockwise to its open dotted line position in opposition to the bias of spring 115. Preferably, the upper end 136b of armature 136a is rounded where it contacts finger extension 106b to minimize scuffing and wear of those engaging parts.

Also, for convenience, the lower end of armature 136a is exposed and a plate 145 is mounted to that end to facilitate manually moving the finger 106 to its open position for test purposes by pushing the armature upwards.

When the carriage 66 is moving towards its advanced position to transport a disk from hopper 26 to the disk drive DD, the finger 106 is in its upper position so that its leading edge 114b is in position to pick off just the lowest disk D as the finger passes under the hopper so that only that lowest disk is pushed from the hopper to the disk drive. On the other hand, when it is desired to retrieve a disk D from the disk drive DD, the solenoid 136 can be energized by controller 13 to pivot the finger to its open position for a sufficient length of time to permit the disk being retrieved to be positioned between fingers 104 and 106 so that, when the solenoid is deenergized, the disk will be clamped or gripped between those fingers enabling that disk to be withdrawn from the disk drive along shelves 58 as the carriage 66 is returned to its home position.

Preferably, a set screw 146 is turned down through a vertical internally threaded passage 148 in the finger extension 106b so that its lower end can engage the top of block 84. By turning that set screw in one direction or the other, the rest angle of finger 106 can be adjusted so that, when the carriage is advancing to transport a disk from hopper 26, the finger edge 114b assuredly engages and picks off only the lowest disk D from the stack in the hopper.

Turning now to FIGS. 2 and 3, the carriage 66 is moved between its home and advanced positions by a motorized crank assembly indicated generally at 152. That assembly comprises a step motor 154 which is mounted by appropriate threaded fasteners 155 to the top of base plate 10 at a location spaced to the left of hopper 26 as viewed in those figures. The shaft 154b of the motor which rotates in steps of about 1.8°, extends axially from both ends of the motor housing, its lower end passing through a clearance hole in base 10 and being connected to one end of a crank arm 156. The opposite end of that crank arm is connected by a pivot 158 to one end of a spring-loaded, telescoping push rod indicated generally at 162. The rod 162 extends from that arm to carriage 66 where its opposite end overlies the block section 84a thereon as best seen in FIGS. 2, 6 and 7. That end of the rod is formed with a vertical passage 164 fitted with a bushing 166 which receives a shoulder bolt 168 whose shaft is turned down into a vertical threaded passage 169 in block section 84a, thereby pivotally connecting the rod to the block.

The push rod actually comprises an elongated rigid rod-like member 170 whose left-hand end segment is threadedly received in a nut 171a formed at the end of a fitting 171 connected by pivot 158 to crank arm 156. Thus, the extended length of the rod 162 can be adjusted by rotating member 170 and fitting 171 relative to one another about their common axis so that, when the crank assembly is at bottom dead center, carriage 66 is positioned so that finger mechanism 82 is just outside hopper 26 as shown in FIG. 2. The right-hand end of the push rod 162 that is pivotally connected to block 84 is formed as a slide 172 with a longitudinal passage 173 that slidably receives the end of the member 170. A pin 174 extending laterally from the right-hand end of the member 168 is received in a longitudinal slot 176 present in the side wall of slide 172. The length of the slot is such that push rod 162 as a whole can telescope between an extended position shown in FIG. 2 and a collapsed position which accommodates approximately 45° of rotation of crank arm 156 shown by angular sectors A in FIG. 8A, when the crank assembly is near its top or its bottom dead center positions for reasons that will be discussed in detail later. The pushrod is biased to its extended position by a coil spring 178 encircling the rod and compressed between the slide 172 and a sleeve-like retainer 182 adjustably secured to the rod as best seen in FIG. 2.

The upper end of motor shaft 154b extends above the motor housing and mounted to that shaft end for rotation therewith is a timing or encoding disk 186. The timing disk has a pair of radial slits 187a and 187b which are best seen in FIG. 3. These slits are about one-half inch long and slit 187b is spaced 90° ahead of slot 187a. Spaced around the timing disk are three optical detectors 188a, 188b and 188c supported by upstanding brackets 192 whose lower ends are turned outwardly and secured to base plate 10 by the same threaded fasteners 155 that mount the motor 154 to that plate. The detectors 188a and 188b are spaced 90° apart and detector 188c is spaced about 200° ahead of detector 188b. They are conventional optical detectors having a light source on one side of the timing disk and a photodiode on the opposite side thereof which is illuminated each time a slit passes between the light source and photodiode.

The outputs of detectors are applied to the transport's controller 13 and they are used to control the angular position of the motor armature and thus the crank angle of the crank assembly and the position of carriage 66 at critical positions along its track. These critical positions are the home position of the carriage, when the crank is at bottom dead center as illustrated in FIG. 2, and a standby position of the carriage, when the crank is about 20° past top dead center as shown in FIG. 8E, where the carriage waits to retrieve a disk from the disk drive DD. Actually, each detector has an angular resolution of four steps of motor 154, i.e. 7.2°, so that two of the detectors, namely detectors 188a and 188b are used together to double the detection resolution for the home or retracted position of the carriage because that is the most critical position to which all other transport control functions are referenced.

Preferably, a knob 194 is fixed to the top of motor shaft 154b projecting above disk 186 to enable the operator to rotate the motor shaft manually to move carriage 66 to any position along its track for test purposes or for any other reason.

Referring now to FIGS. 2 to 4, since the illustrated apparatus is being used to transport microdisks D to and from the disk drive DD for purposes of certification or evaluation, it is desirable that the disks being retrieved from the disk drive be routed to different receiving locations depending upon whether they pass or fail certification. Accordingly, the apparatus includes a pair of bins 202 and 204 positioned inside housing 12 below shelves 58. Also, a slide 206 is mounted to the underside of base 10 below hopper 26. The slide is composed of a pair of laterally spaced-apart vertical plates 206a and 206b which extend parallel to support plates 32 and are secured to base 10 via their outturned upper edge margins by the same threaded fasteners 34 that anchor the support plates to the base. Slide plates 206a and 206b have inturned lower edges which extend downwardly forwardly terminating above bin 202.

A selector assembly indicated generally at 208 is located below shelves 58 and centered above bins 202 and 204. Assembly 208 is supported by a pair of depending straps 212 which are bolted to spacer bars 18 adjacent their right-hand ends. The assembly also includes a rotary solenoid 214 mounted to the inboard face of a strap 212, e.g., the right-hand strap. The solenoid has an armature 214a which is connected to one end of a rod 216 when the opposite end is journaled in the left-hand strap 212. Preferably, that connection includes a torsion coupler 218 (FIG. 3) which has some angular forgiveness or "give" to minimize the transmission of shock forces between the solenoid armature and the rod. The rod is biased toward the solenoid by a spring 224 which is compressed between the left-hand strap 212 and a C-clip 226 engaged in an appropriate circumferential groove in the rod, as best shown in FIG. 2.

The selector assembly further comprises a pair of laterally spaced-apart arms 228 having corresponding first ends mounted to rod 216. The arms extend upwardly rearwardly below shelves 58 with their opposite ends terminating adjacent slide plates 206a and 206b. The selector arms normally repose in a lower position indicated in solid lines in FIG. 2 wherein they are directly aligned with, and essentially extensions of, slide 206. They are maintained in that position by gravity when the solenoid 214 is de-energized. Additional bias to that position may be provided by capturing the opposite ends of spring 218 in appropriate openings in the adjacent strap 212 and clip 226 so that unwinding of the spring tends to cause counterclockwise rotation of rod 216.

Arms 228 normally function as a continuation of the slide 206 so that a disk D dropped onto the slide by finger mechanism 82 when carriage 66 is being retracted will slide along those arms into the forward bin 204. However, when solenoid 214 is energized by a signal from controller 13, its armature and the rod 216 connected thereto rotate clockwise through an angle of about 25° with the result that arms 228 are moved to their upper position shown in dotted lines in FIG. 1. In that position, the arms are located above the slide 206 so that a disk deposited onto the slide will slide down into the rear bin 202. Thus, by controlling the selector assembly with appropriate signals from controller 13, the microdisks D which pass certification can be collected in bin 204, while those which fail can be collected in bin 202, or vice versa.

The apparatus's controller 13 is a standard one and will not be detailed here. The signals required from the controller and their timing are readily apparent from the apparatus's operating sequence about to be described. It should be mentioned here, however, that the controller 13 as well as the bins 202 and 204 and their contents are readily accessed by swinging up base plate 10 on its hinge 14 as shown in dotted lines in FIG. 1. Preferably, means are provided for maintaining the plate 10 in its open position. More particularly and as shown in FIGS. 1, 3 and 4, a pair of hydraulic piston-like lifters 234 are provided at each side of base 10. Each lifter includes a cylinder 234a whose end is pivotally connected to a pin 236 projecting laterally from the adjacent spacer bar 18 and a telescoping rod 234b extending from the opposite end of the cylinder and pivotally connected to a laterally extending shaft 238 mounted between the side walls of housing 12. Each lifter 234 tends to elongate and it is connected between its pin 236 and shaft 238 in an overcentered condition best seen in FIG. 4. In other words, its connection to shaft 238 is located above the connection to pin 236. Therefore, when the plate 10 is almost in its closed position shown in FIG. 1, the natural extensions of the lifters tend to maintain the plate in that closed position. However, when the right-hand end of the base plate 10 is swung up away from the housing, the lifters are forced to contract until they swing through their center positions. Thereafter, they tend to extend, and so assist in the raising of plate 10 and the maintaining of the plate in an open position which completely exposes the interior of housing 12.

As best seen in FIG. 1, a control panel 242 is mounted over an opening in the rear wall of housing 12. The panel carries a series of control buttons which control internal switches in controller 13. Thus, there is an ON-LINE button 244a which connects the controller to the master computer of the disk drive DD so that the operations of the transport are coordinated with those of the disk drive. There is also a START button 244b and an EMERGENCY STOP button 244c. In addition, the panel has three signal lamps, namely a green lamp G, a yellow lamp Y and a red lamp R. Finally, the panel carries a warning buzzer 246. The lamps and buzzer are all connected to controller 13 and are actuated when certain conditions are present in the apparatus. Thus, lamp G is illluminated when the system is operating normally. The lamp Y is illuminated when the detector 35a senses block B indicating that the hopper 26 is almost empty of disks. Also, buzzer 246 is sounded briefly when that condition exists. The lamp R flashes under the control of the controller when the lower detector 35b senses the block and the hopper is completely empty of disks. In that event also, buzzer 246 is also sounded three times.

Figures 8A, 8B, 8C:
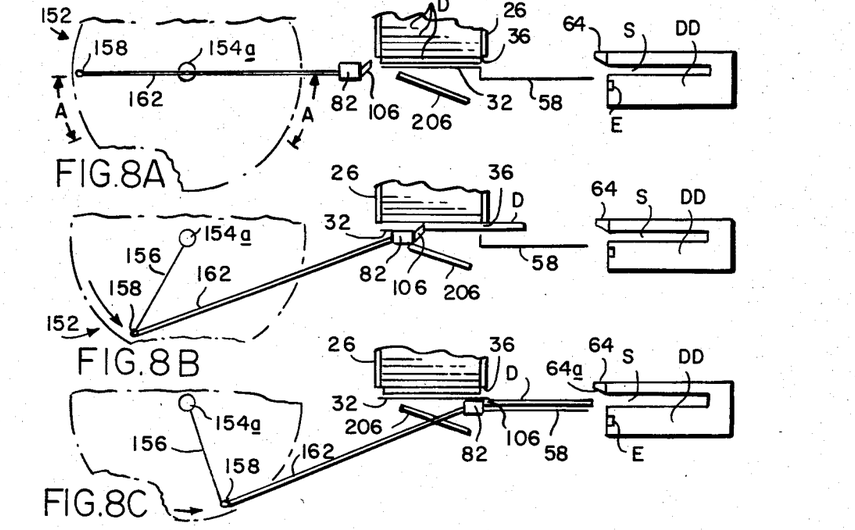
FIGS. 8A to 8G are schematic diagrams illustrating the operation of the FIG. 1 transport.

Referring now to FIGS. 8A to 8G, during operation of the apparatus, the carriage 66 reposes initially in its retracted or home position illustrated in FIG. 8A (and FIG. 2) with the moving finger 106 of mechanism 82 in its upper position so that the leading edge 114b of the finger is directly opposite the edge of the lowest disk D in hopper 26. As noted above, that position is established by controller 13 from signals provided by detectors 188a and 188b to an accuracy of 3.6° when they sense the disk slits 187a and 187b respectively as shown in FIG. 3. To start the apparatus, the operator first depresses the ON-LINE button 244a to connect the transport's controller 13 to a cable (not shown) leading to the main computer of the disk drive. Then, he depresses the START button 244b. This causes the controller 13 to activate the step motor 154 which turns the crank arm 156 so that the carriage 66 is advanced toward the disk drive. As shown in FIG. 8B, finger 106 engages the edge of the lowest disk D in the hopper and pushes that disk out through the clearance slot 36 at the front of the hopper at the level of the support plates 32.

The edge of the disk D that is engaged by the finger 106 is more or less square or flat but the thicknesses or heights of the disk cases may vary slightly. Therefore, the upper segment 114a of the finger face 114 is angled forwardly as best seen in FIG. 7 so that it presents the sharp edge 114b to the disk. Also, the forwardly inclined face segment 114a itself tends to urge the engaged edge of the lowest disk downward away from the next upper disk in the stack. These factors enable the finger to reliably pick off only the lowest disk in the stack even though there may be some variation in the vertical position of that disk.

Figure 8D:
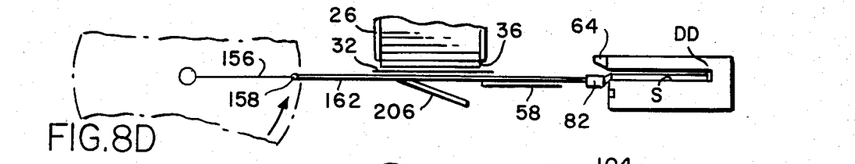
Figure 8E:
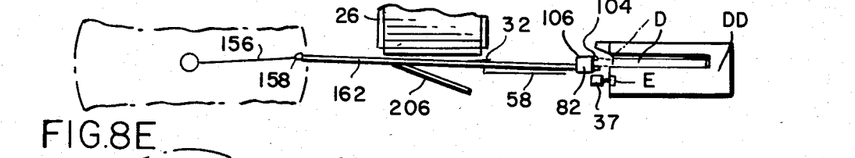

As that disk is pushed from hopper 26 through slot 36, it remains at the level of plates 32 althouth its leading edge may tend to tilt down toward shelves 58. However, as soon as the trailing edge of the advancing disk clears support plates 32, the entire disk drops down onto shelves 58 where it is aligned with the loading slot S of the disk drive as shown in FIG. 8C. Also, when the disk does drop onto shelves 58, its leading edge is located under the deflection bar 64 at the mouth of slot S. This assures that the disk will remain aligned with the slot even though the disk may bounce or flutter somewhat on shelves 58 due to air currents or to the formation of an air cushion between the disk and shelves because of the rapid movement of the disk. As the crank assembly 152 continues to turn to its top dead center position, the finger mechanism 82 normally loads the disk D completely into slot S as shown in FIG. 8D.

During the aforesaid movement of the crank assembly 152, the controller 13 interrogates the detectors 188a and 188b each 1.8° step of the motor 154 and also reviews the status of the transport's other detectors 35a, 35b, 37 and 65 to be sure that the transport is operating normally. If the lowest disk fails to clear slot 36 or if a second disk is dragged along with the lowest disk and obstructs the slot, the detector 37 which sights along the slot senses the blockage and applies a signal to controller 13 when interrogated as described above. The controller thereupon shuts off motor 154 to prevent damage to the disks or to the transport. The controller also illuminates lamp Y and sounds buzzer 246 to apprise the operator of the stoppage.

Similarly, in the event that a disk D is not loaded properly into the drive DD either because the disk is bent or due to a malfunction of the transport or the drive, that condition is sensed by the detector 65 which sights along the drive slot S. That detector, when interrogated by the controller 13, thereupon applies a control signal to the controller which shuts off the transport and issues the same warnings just described.

In the illustrated apparatus, it normally takes 100 steps of motor 154 to rotate the crank assembly between bottom dead center and top dead center, i.e., 180°. As we shall presently see, however, the transport actually allows up to 111 step signals from the controller to the motor to achieve that crank rotation. With that 180° rotation, the carriage 66 travels about 8.5 inches along its track, which is the distance between the home and advanced positions of the carriage. During its travel along the track, however, the carriage may be stopped or slowed momentarily due to some obstruction on rails 16 or due to some other reason. In that event, the motor could not execute an angular step of its armature in response to a step signal from controller 13. Rather, the magnetic coupling between the stationary and rotating magnetic fields of the motor would slip causing the motor to skip a step or several steps. Obviously, if that should occur, the carriage will not reach top dead center and the disk will not be loaded into the disk drive after the controller 13 has applied 100 step signals to the motor. Ordinarily, then, controller 13 would shut off the transport when, upon interrogating detector 65 after 100 motor steps, it found that the disk was not loaded into the drive.

To avoid such unnecessary shutdowns, the present apparatus allows an extra 11 step signals to motor 154 to load the disk into the drive before it will shut off motor 154 and signal a malfunction. In other words, it does not interrogate detector 65 until after 111 step signals to the motor. Only if there is still a no-load condition after that time does it shut off the transport.

Push rod 162 is made somewhat longer than the distance between crank arm pivot 158 and the rod pivot to the carriage when the carriage is in its advanced position. Also, as noted above, it is spring loaded so that it is able to collapse as the disk D is seated in drive DD. Thus, the transport always provides just the right amount of force, as determined by spring 178, to load the disk properly into the drive despite small variations in the spacing of the drive with respect to the crank assembly 152. The telescoping push rod has another important function as well. If carriage 66 should be impeded momentarily as just described, the push rod provides enough compliance to absorb the resulting shock, thereby minimizing stress and damage to the apparatus parts. More importantly, if the carriage should be unable to move at all along rails 16 due to a jamming of its wheels or some blockage, the crank assembly will continue to turn, with push rod 162 collapsing as necessary (up to about two inches) until the crank angle reaches about 45° (advancing) or about 270° (retracting). At these angles, the reaction force of the stalled carriage acting through the crank arm 156 provides a reaction torque which is large enough to stall motor 154. Thus the crank assembly is effectively decoupled from the carriage at the crank angles within sectors A shown in FIG. 1 when the X-axis force applied by the assembly 152 to the carriage 62 is highest. This minimizes the likelihood of damage to the carriage or to the crank assembly parts or to the microdisks in the event of such a total disruption.

When the disk is loaded properly into the disk drive DD, the drive commences a read/write operation on the disk, while stepper motor 154 continues rotating 11 more steps in the same direction until detector 188c senses slit 187b. This turns the crank arm 156 about 19.8° past top dead center and retracts the carriage about one inch to its standby position just in front of the disk drive as shown in FIG. 8E. If the carriage fails to reach its standby position at which the timing disk slit 187b is opposite detector 188c by the time controller 13 interrogates that dectector, i.e., after 122 motor steps, the controller will shut off the apparatus and signal a malfunction as before.

The carriage remains at standby until the disk drive has completed its operation on the disk therein. When that occurs, the disk drive issues a signal by way of its central computer to the transport's controller 13. The controller thereupon energizes the finger mechanism solenoid 136 for a short time causing the finger 106 to pivot to its lower position shown in dotted lines in FIG. 7. In that position, the upper surface 114c of that finger is oriented horizontally and forms, with the stationary fingers 104, an open mouth or jaw directly in front of the disk drive loading slot S as shown in FIG. 8E. The controller also energizes solenoid 37 causing its armature 37a to press the disk drive's eject button E with the result that the disk D therein is ejected from slot S far enough so that its rear edge margin is positioned in the gap between the fingers 104 and 106 before the solenoid 136 is de-energized. Resultantly, the disk is clamped between fingers 104 and 106 as shown in dotted lines in FIG. 8E.

Figure 8F:
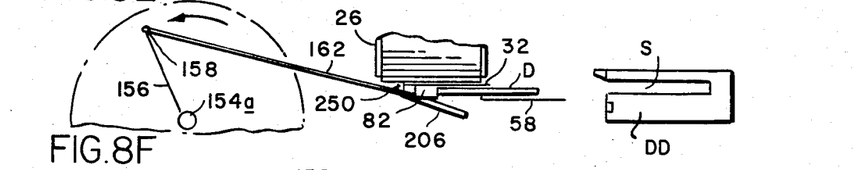
Figure 8G:
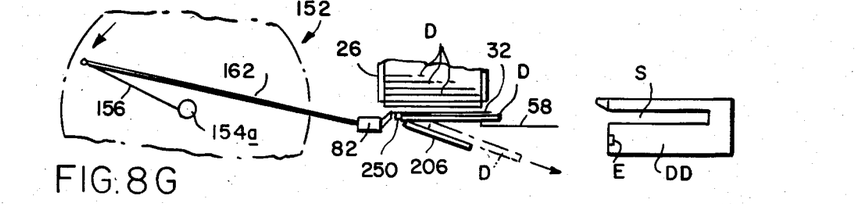

At about the same time, the controller 13 activates the step motor 154 causing the motor to turn the crank arm 156 from its position shown in FIG. 8E toward its bottom dead center position illustrated in FIG. 8A. The crank assembly thereupon retracts the carriage 66 and its finger mechanism 82 from the disk drive with the result that the disk D is withdrawn from slot S and pulled along shelves 58 below the plates 32 which support the stack of disks in hopper 26, as seen in FIG. 8F. When that disk is positioned over slide 206, as shown in solid lines in FIG. 8G, the controller 13 energizes solenoid 136 momentarily thereby pivoting finger 106 to its lower position so that the disk is released from the finger mechanism 82 and drops onto slide 206 as shown in dotted lines in that same figure. Preferably, to ensure that the disk does disengage from the finger mechanism, the apparatus includes stripper pins 250 which depend from support plate 32 in the path of disk D being retracted along shelves 58, as shown in FIGS. 3, 5 and 7. Upon engagement with the stripper pins 250, the disk is forcibly pulled out from between the fingers 104 and 106 of the retracting finger mechanism 82.

Upon completion of the certification process on that disk, the drive will have issued a signal via its main computer to the transport's controller 13 if the disk failed the test. This causes the controller 13 to energize the rotary solenoid 214 at the time the crank assembly 152 is actuated to withdraw the disk from the drive. The resulting rotation of the solenoid armature swings the arms 228 to their upper dotted line position shown in FIG. 2 with the result that the failed disk drops into bin 202. If, on the other hand, that disk was certified by the drive, no such signal is issued to the controller 13 and the arms 228 remain in their lower position shown in solid lines in that figure. Accordingly, the certified disk that is dropped onto slide 206 slides along those arms into bin 204.

As the microdisk D is routed to bin 202 or 204, the carriage 66 continues on to its home or fully retracted position shown in FIG. 8A which is reached when detectors 188a and 188b sense slits 187a and 187b respectively. Now the apparatus is ready to transport the next disk from hopper 26 to the disk drive DD. If that does not occur with 233 steps of the motor (i.e. 111+11+111 steps), a malfunction is indicated and the motor 154 is shut off.

Typically, the transport completes a full cycle in about 1.7 seconds (excluding time spent at standby). Assuming that the apparatus is operating in an automatic mode when on line with the drive DD, the crank assembly 152 immediately starts another cycle to advance carriage 62 to pick up and transport the disk now at the bottom of hopper 26 to the disk drive as described above. The apparatus is arranged to cycle continuously as long as microdisks remain in hopper 26 and the transport is otherwise operating normally.

If the supply of disks in hopper 26 is becoming depleted, the block B is eventually brought opposite detector 35a which is interrogated by the controller at each step of the motor. The detector senses the block and applies a signal to controller 13. In response to that signal, the controller illuminates the yellow warning lamp Y and sounds the buzzer 246 once. If the hopper is still not refilled, the block B eventually moves opposite detector 35b which senses the block and issues a signal to the controller signalling that the hopper is empty. The controller thereupon shuts off motor 154; it also causes the red lamp R to flash and sounds the buzzer 246 three times to tell the operator to refill the hopper.

Of course, any time the operator wants to stop the transport, he may press the STOP button 244c which will cause the controller 13 to immediately de-energize motor 154.

It will be seen from the foregoing, then, that the transport described herein is quite able to transport the new microdisks to and from a disk drive one after the other reliably and with a high cycle rate. The unique motorized crank assembly that actually moves the disks is designed to minimize jamming and to minimize the likelihood of damage if, by chance, a jam should occur. Those features coupled with the electrical interlocks described above should give the apparatus a long service life with a good repair and maintenance record. However, if repairs are required, they can be made quite easily because all of the internal components of the transport are readily accessible as described above.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. Transport apparatus for microdisks comprising
   A. a base;
   B. stationary supporting means on the base for supporting a stack of microdisks;
   C. stationary microdisk drive mounting means on the base at a location thereon spaced from the supporting means;
   D. means defining a track extending along the base between the supporting means and the mounting means;
   E. a carriage movable along a track;
   F. means for moving the carriage along said track between a retracted position wherein the carriage is located on the opposite side of the supporting means from the mounting means and an advanced position wherein the carriage is located adjacent to the mounting means, said moving means comprising
      (1) an electric motor which receives signals from the control means,
      (2) a crank arm having one end connected to rotate with the motor armature in a plane parallel to said track, and
      (3) connecting means having one end pivotally connected to the other end of the crank arm and having its opposite end pivotally connected to said carriage;
   G. microdisk engaging means mounted to the carriage for engaging and pushing the lowest microdisk in the stack supported by the supporting means to the mounting means when the carriage is moved to its advanced position by said moving means and for pulling that same microdisk from the mounting means back toward the stack supporting means when the carriage is moved by said moving means to its retracted position;
   H. control means for for providing control signals to said motor so that said crank arm moves continuously from a first crank angle which places said carriage in its home position through a second crank angle which places said carriage in its advanced position to a third crank angle which positions said carriage in a standby position spaced in front of said mounting means.

2. The transport defined in claim 1 wherein said control means also control said motor so that the crank arm turns continuously from said third crank angle to said first crank angle to return said carriage from said standby position to said home position.

3. The transport defined in claim 1 wherein the distance between said retracted and advanced positions of the carriage is less than twice the radius of the crank arm.

4. The transport defined in claim 3 wherein said connecting means include
A. a pair of sections which telescope between an axially extended position and an axially collapsed position; and
B. means for urging said members to said extended position so that, in the event said carriage is stalled in its movements along said track, said motor armature and crank arm can continue to turn to selected crank angles more or less midway between the top dead center and bottom dead center positions of the crank arm.

5. The transport defined in claim 1
A. wherein said motor requires a selected number of step signals from said control means to move said carriage from its home position to its advanced position; and
B. further including
(1) first detection means for emitting a first signal when the carriage is in its home position;
(2) second detection means for emitting a second signal after said carriage has moved to its advanced position; and
(3) means in said control means for interrogating said detection means for the presence of said first and second detection means signals only after said control means has applied more than said selected number of step signals to said motor.

6. The transport apparatus defined in claim 1 and further including
A. first means for sensing when the microdisk stack by the supporting means is nearly depleted; and
B. second sensing means for sensing when the microdisk stack supported by the support means is depleted.

7. The transport apparatus defined in claim 1 wherein
A. said mounting means are movable on said base toward and away from said supporting means; and
B. means for releasably adjusting the position of the mounting means relative to said supporting means.

8. The apparatus defined in claim 1 wherein said microdisk-engaging means comrpise
A. a stationary finger which is located below the plane defined by the lowest microdisk in the stack supported by the supporting means;
B. a second finger;
C. means movably mounting the second finger to the carriage for movement relative to said stationary finger between a first position wherein it projects above said stationary finger through said plane and a second position wherein the second finger is spaced below said stationary finger to form a gripping jaw therewith;
D. means urging the second finger toward its first position; and
E. electric means for moving said second finger to its said second position.

9. The transport defined in claim 1, and further including a disk drive for microdisks mounted in the mounting means.

10. The transport defined in claim 9 wherein the microdisks are pushed from the supporting means substantially to said mounting means along a first generally horizontal plane and are pulled away from said mounting means toward the support means along a second generally horizontal plane spaced below the first plane.

* * * * *